(12) United States Patent
Davis et al.

(10) Patent No.: US 6,425,413 B2
(45) Date of Patent: Jul. 30, 2002

(54) VALVE WITH SECONDARY LOAD BEARING SURFACE

(75) Inventors: Glenn Ray Davis, Euless; Stuart Morton Dennistoun, Carrollton, both of TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/836,019

(22) Filed: Apr. 17, 2001

Related U.S. Application Data

(60) Division of application No. 09/483,355, filed on Jan. 14, 2000, now Pat. No. 6,263,910, which is a continuation-in-part of application No. 09/309,716, filed on May 11, 1999, now Pat. No. 6,196,261.

(51) Int. Cl.$^7$ .......................... F16K 15/03; E21B 34/10
(52) U.S. Cl. .................. 137/527; 137/516.27; 166/325; 166/332.8
(58) Field of Search ........................ 137/516.25, 516.27, 137/527; 251/63.4, 334, 360; 166/319, 321, 322, 332.8, 325

(56) References Cited

U.S. PATENT DOCUMENTS

| | | | |
|---|---|---|---|
| 2,744,539 A | 5/1956 | Jones | 137/527.4 |
| 4,583,596 A | 4/1986 | Davis | 166/332 |
| 4,674,575 A | 6/1987 | Guess | 166/332 |
| 4,926,945 A | 5/1990 | Pringle et al. | 166/321 |
| 5,125,457 A | 6/1992 | Meaders | 166/322 |
| 5,137,089 A | 8/1992 | Smith et al. | 166/321 |
| 5,263,847 A | 11/1993 | Akkerman et al. | 251/303 |
| 5,323,859 A | 6/1994 | Smith et al. | 166/321 |
| 5,682,921 A | 11/1997 | Rawson et al. | 137/527.6 |
| 5,884,705 A | 3/1999 | Hill, Jr. | 166/324 |

*Primary Examiner*—John Rivell
*Assistant Examiner*—Ramesh Krishnamurthy
(74) *Attorney, Agent, or Firm*—Lawrence R. Youst; William M. Imvalle

(57) ABSTRACT

A valve (120) for controlling fluid flow therethrough in downhole applications is disclosed. The valve (120) comprises a valve housing having a valve closure mechanism (122) and a valve seat (124) disposed therein. The valve closure mechanism (122) has sealing surface (128) and a secondary load bearing surface (142). The valve seat (124) has a valve seat sealing surface (126) that mates with the sealing surface (128) of the valve closure mechanism (122). The secondary load bearing surface (142) of the valve closure mechanism (122) mates with a valve secondary load bearing surface (134) which may be supported by the valve seat (124).

16 Claims, 8 Drawing Sheets

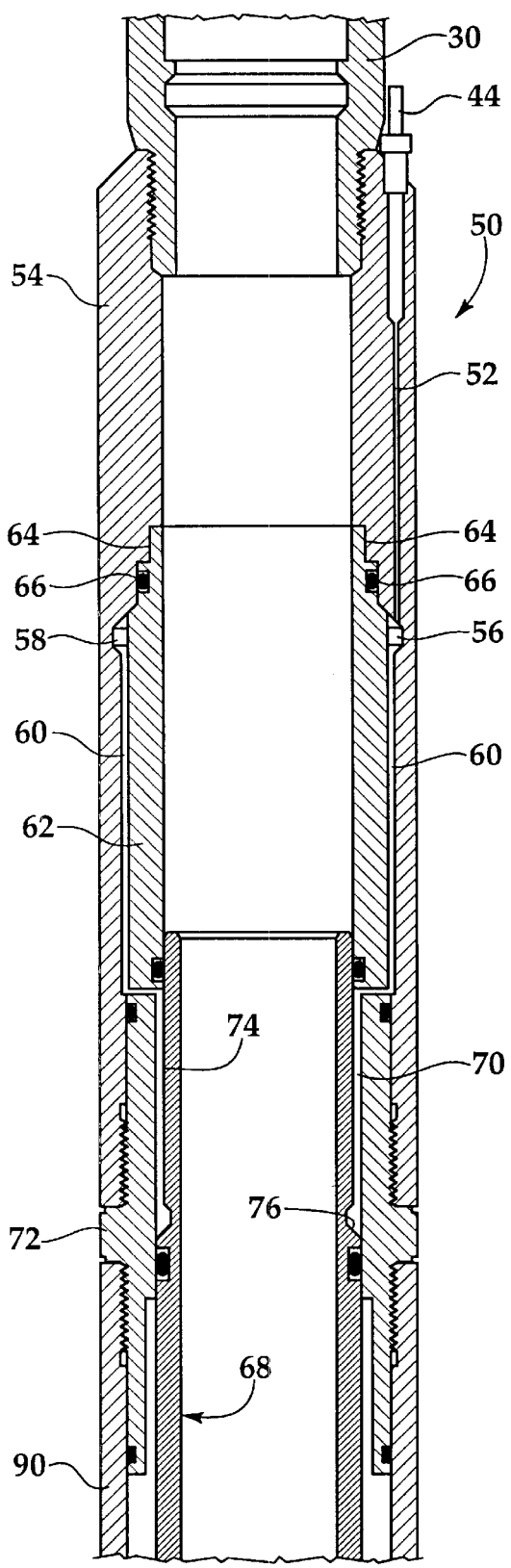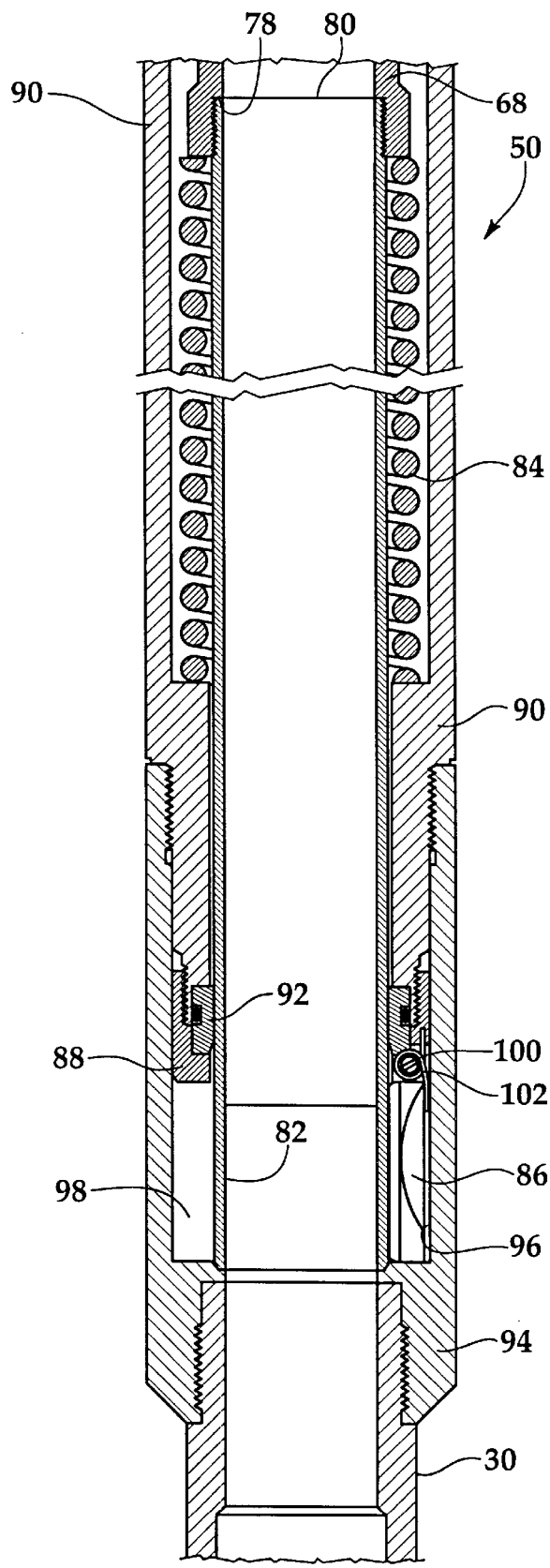
*Fig.2A*  *Fig.2B*

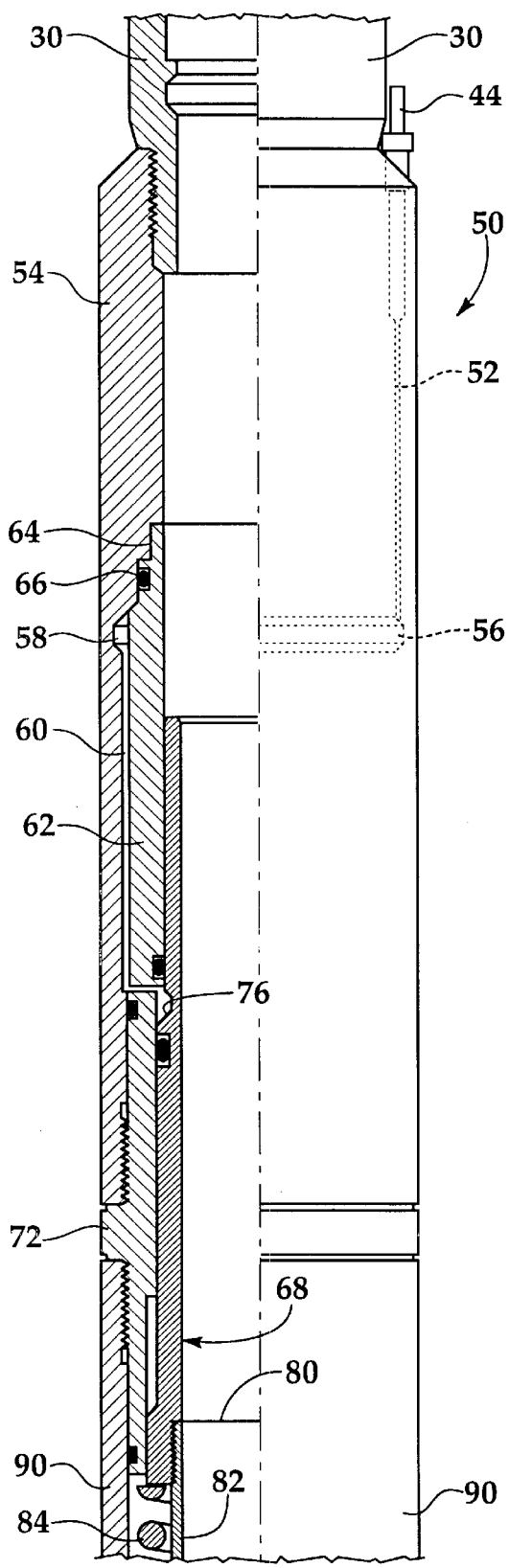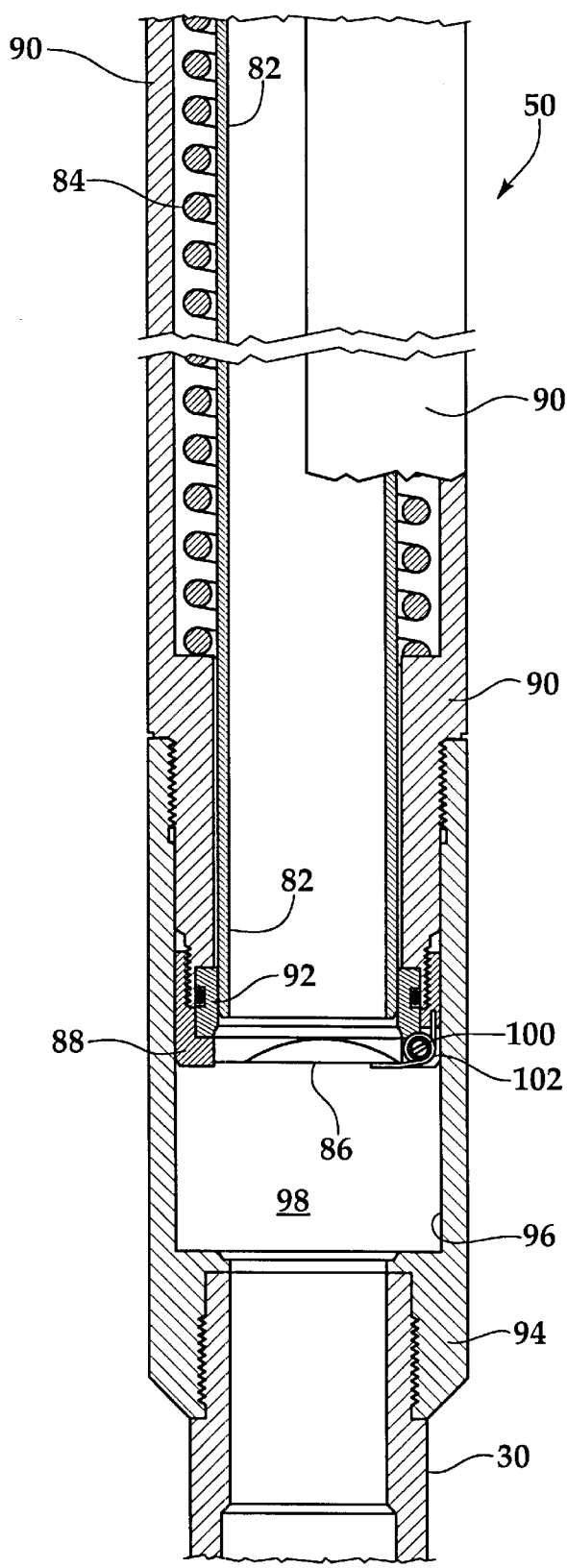
*Fig. 3A*  *Fig. 3B*

VALVE WITH SECONDARY LOAD BEARING SURFACE

RELATED APPLICATION

This application is a divisional application of application Ser. No. 09/483,355 filed on Jan. 14, 2000 now U.S. Pat. No. 6,263,910 which is a continuation-in-part of application Ser. No. 09/309,716 filed on May 11, 1999, now U.S. Pat. No. 6,196,261.

TECHNICAL FIELD OF THE INVENTION

This invention relates in general to subsurface safety valves and, in particular, to a subsurface safety valve that includes a valve sealing surface and a secondary load bearing surface.

BACKGROUND OF THE INVENTION

Without limiting the scope of the invention, the background will describe surface controlled, subsurface safety valves, as an example.

Surface controlled, subsurface safety valves are commonly used to shut in oil and gas wells in the event of a failure or hazardous condition at the well surface. Such safety valves are typically fitted into the production tubing and operate to block the flow of formation fluid upwardly therethrough. The subsurface safety valve provides automatic shutoff of production flow in response to a variety of out of range safety conditions that can be sensed or indicated at the surface. For example, the safety conditions include a fire on the platform, a high or low flow line temperature or pressure condition or operator override.

During production, the subsurface safety valve is typically held open by the application of hydraulic fluid pressure conducted to the subsurface safety valve through an auxiliary control conduit which extends along the tubing string within the annulus between the tubing and the well casing. Flapper type subsurface safety valves utilize a closure plate which is actuated by longitudinal movement of a hydraulically actuated, tubular piston. The flapper valve closure plate is maintained in the valve open position by an operator tube which is extended by the application of hydraulic pressure onto the piston. A pump at the surface pressurizes a reservoir which delivers regulated hydraulic control pressure through the control conduit. Hydraulic fluid is pumped into a variable volume pressure chamber and acts against the crown of the piston. When, for example, the production fluid pressure rises above or falls below a preset level, the control pressure is relieved such that the piston and operator tube are retracted to the valve closed position by a return spring. The flapper plate is then rotated to the valve closed position by a torsion spring or tension member.

In conventional subsurface safety valves of the type utilizing an upwardly closing flapper plate, the flapper plate is seated against an annular sealing face, either in metal-to-metal contact or metal against an annular elastomeric seal. In one design, the flapper closure plate has a flat, annular sealing face which is engageable against a flat, annular valve seat ring, with sealing engagement being enhanced by an elastomeric seal ring which is mounted on the valve seat. In another design, the valve seat includes a downwardly facing, conical segment having a sloping sealing surface and the flapper closure plate has a complementary, sloping annular sealing surface which is adapted for surface-to-surface engagement against the conical valve seat surface.

Typically, the flapper closure plate is supported for rotational movement by a hinge assembly which includes a hinge pin and a torsion spring or tension member. It will be appreciated that structural distortion of the flapper valve closure plate, or damage to the hinge assembly which supports the flapper closure plate, can cause misalignment of the respective sealing surfaces, thereby producing a leakage path through the safety valve.

Such misalignment will prevent correct seating and sealing of the flapper closure plate, and formation fluid may escape through the damaged valve, causing waste and pollution. During situations involving damage to the wellhead, the well flow must be shut off completely before repairs can be made and production resumed. Even a small leak through the flapper safety valve in a gas well can cause catastrophic damage.

Attempts have been made to overcome this misalignment problem. For example, one design involves the use of a valve seat and an upwardly closing flapper plate each having a sealing surface with a matched spherical radius of curvature. That is, the valve seat is a concave spherical segment and the sealing surface of the flapper plate is a convex spherical segment. In this arrangement, the spherical radius of curvature of the concave valve seat spherical segment is matched with the spherical radius of curvature of the convex spherical segment which defines the sealing surface on the flapper plate. The matching spherical surfaces are lapped together to provide a metal-to-metal seal along the interface between the nested convex and concave sealing surfaces.

As such, the convex spherical sealing segment of the flapper plate is received in nesting engagement within the concave spherical segment surface of the valve seat, which allows some angular displacement of the flapper plate relative to the valve seat without interrupting surface-to-surface engagement therebetween. Thus, the concave spherical seating surface of the safety valve seat will tolerate a limited amount of misalignment of the flapper plate which might be caused by structural distortion of the closure plate or warping of the hinge assembly.

It has been found, however, the even when using spherical sealing surfaces leakage may occur. Specifically, applications using large diameter tubing and having a low ratio between the outer diameter and the inner diameter of the sealing surfaces, distortion of the flapper closure plate caused by increased loads on the flapper closure plate may result in a loss of the seal. These increased loads are developed as a consequence of using larger safety valves having larger flapper closure plates in larger tubing.

Therefore, a need has arisen for a flapper valve that maintains a seal in a well requiring a large diameter flapper valve having a low ratio between the outer diameter and the inner diameter of the sealing surfaces. A need has also arisen for such a flapper valve that does not experience a loss of the seal in response to distortion of the flapper closure plate caused by the increased loads associated with such designs.

SUMMARY OF THE INVENTION

The present invention disclosed herein is a valve comprising a valve closure mechanism that mates with a valve seat, where the valve has enhanced load-bearing capability. The valve of the present invention has separate sealing and load bearing surfaces, and can thus be deployed in a well requiring a large diameter valve having a low ratio between the outer diameter and the inner diameter of the sealing surfaces. The enhanced load-bearing capability of the valve of the present invention is particularly applicable in high pressure situations. Furthermore, the valve of the present invention does not experience a loss of the seal in response to distortion of the valve closure mechanism due to the increased loads on the valve that are associated with such applications.

The valve of the present invention comprises a valve housing, a valve closure member having a sealing surface and a secondary load bearing surface, a valve seat having a valve seat sealing surface, and a secondary load bearing surface that is located on either the valve seat or as part of the valve housing or on both the valve seat and the valve housing. The valve closure mechanism includes a secondary load bearing surface that may be located anywhere on, or formed as an integral part of, the valve closure mechanism. The valve closure mechanism secondary load bearing surface may be either an internal or external shoulder, or one or more internal or external support members, or any combination thereof. The load bearing surface of the valve closure mechanism will mate or engage with a load bearing surface found either on the valve seat or the valve housing, or both.

Should the valve seat include a secondary load bearing surface, the secondary load bearing surface may be either an internal load bearing surface of the valve seat or an external load bearing surface of the valve seat. The secondary load bearing surface of the valve seat may be either an internal or external shoulder, or one or more internal support members, or any combination thereof. A secondary load bearing surface may alternatively be coupled to the valve housing or integrally formed thereon. Should the valve housing include a secondary load bearing surface, the secondary load bearing surface of the valve housing may, for example, be an internal shoulder or one or more internal support members, or any combination thereof.

The valve of the present invention may be a flapper valve. Alternatively, the valve of the present invention may be a gate valve, a ball valve, a poppit, a valve having sliding members, a valve having sleeves, and any other types of valves known in the art. Accordingly, the valve closure member of the valve may be a flapper closure plate, a gate, a ball, a sleeve, a sliding member, or any other structure that forms a seal when mated to or engaged with a corresponding valve seat. Furthermore, a flapper closure plate may be flat or contoured.

In one embodiment, the valve includes a tubular valve housing having a valve chamber. A valve seat is mounted within a housing. The valve seat has a sealing surface and a secondary load bearing surface. A valve closure mechanism is provided as a flapper closure plate having a sealing surface and a secondary load bearing surface. The flapper closure plate is disposed within the valve chamber and rotates between a valve open position, in which the flapper closure plate is removed from the valve seat, and a valve closed position, in which the sealing surface of the flapper closure plate sealingly engages the valve seat sealing surface for preventing flow therethrough. When the flapper closure plate is in the valve closed position, the secondary load bearing surface of the valve seat defines the maximum travel of the flapper closure plate.

In one embodiment of the present invention, the secondary load bearing surface of a valve seat is an internal load bearing shoulder that may be machined as an integral part of the valve seat. In another embodiment, the valve seat may include a seal ring insert that comprises a material having a hardness greater than that of the valve seat. The seal ring insert may be a solid ring. Alternatively, the seal ring may be a machined weld bead. In either case, the seal ring insert forms a portion of the valve seat sealing surface and may serve as an internal load bearing shoulder.

In another embodiment, the secondary load bearing surface of the valve seat is an external load bearing shoulder. In this embodiment, the flapper closure plate includes a ballast member extending from the end of the flapper closure plate opposite the pivot pin, such that the external load bearing shoulder of the valve seat and the ballast member of the flapper closure plate define the maximum travel of the flapper closure plate. The external load bearing shoulder may be used alone or in combination with an internal load bearing shoulder or internal support members, each serving as secondary load bearing surface.

BRIEF DESCRIPTION OF THE DRAWINGS

For a more complete understanding of the present invention, including its features and advantages, reference is now made to the detailed description of the invention, taken in conjunction with the accompanying drawings of which:

FIGS. 2A–2B are half sectional views of a subsurface safety valve of the present invention in the valve open position;

FIGS. 3A–3B are half sectional views of a subsurface safety valve of the present invention in the valve closed position;

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
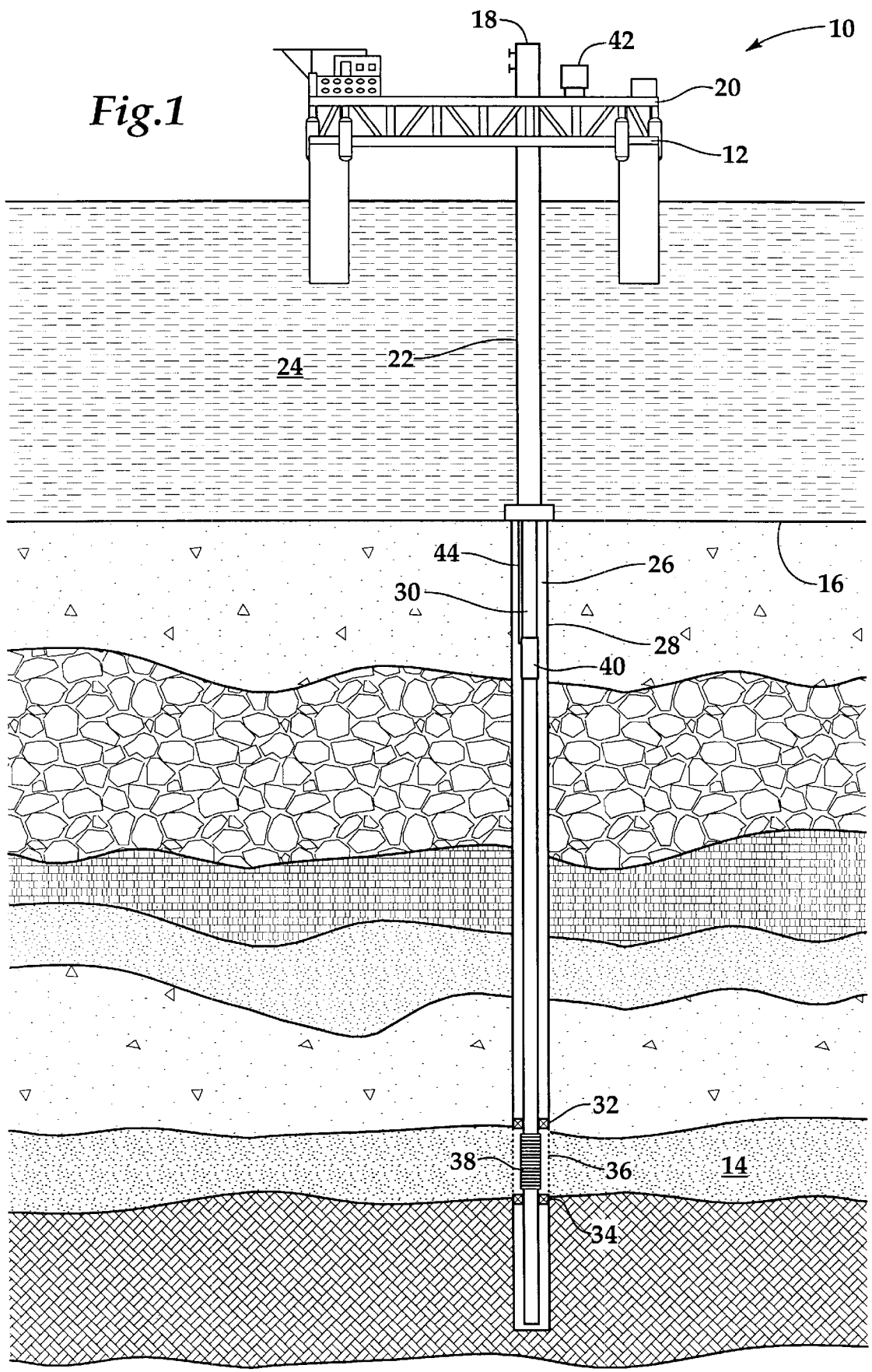
FIG. 1 is a schematic illustration of an offshore oil or gas production platform operating a subsurface safety valve of the present invention.

Referring to FIG. 1, a subsurface safety valve in use with an offshore oil and gas production platform is schematically illustrated and generally designated 10. A semi-submersible platform 12 is centered over a submerged oil and gas formation 14 located below sea floor 16. Wellhead 18 is located on deck 20 of platform 12. Well 22 extends through the sea 24 and penetrates the various earth strata including formation 14 to form wellbore 26. Disposed within wellbore 26 is casing 28. Disposed within casing 28 and extending from wellhead 18 is production tubing 30. A pair of seal assemblies 32, 34 provide a seal between tubing 30 and casing 28 to prevent the flow of production fluids therebetween. During production, formation fluids enter wellbore 26 through perforations 36 of casing 28 and travel into tubing 30 through sand control device 38 to wellhead 18. Subsurface safety valve 40 is located within the production tubing 30 and seals the wellhead 18 from the well formation 14 in the event of abnormal conditions. Subsurface safety valve 40 includes a valve closure mechanism that, during production from formation 14, is maintained in the valve open position by hydraulic control pressure received from a surface control system 42 through a control conduit 44.

Referring now to FIGS. 2A, 2B, 3A and 3B, a subsurface safety valve 50 is illustrated. Safety valve 50 has a relatively larger production bore and is, therefore, intended for use in high flow rate wells. Safety valve 50 is connected directly in series with production tubing 30. Hydraulic control pressure is conducted in communication with a longitudinal bore 52 formed in the sidewall of the top connector sub 54. Pressurized hydraulic fluid is delivered through the longitudinal bore 52 into an annular chamber 56 defined by a counterbore 58 which is in communication with an annular undercut 60 formed in the sidewall of the top connector sub 54. An inner housing mandrel 62 is slidably coupled and sealed to the top connector sub 54 by a slip union 64 and seal 66, with the undercut 60 defining an annulus between inner mandrel 62 and the sidewall of top connector sub 54.

A piston 68 is received in slidable, sealed engagement against the internal bore of inner mandrel 62. The undercut annulus 60 opens into a piston chamber 70 in the annulus between the internal bore of a connector sub 72 and the external surface of piston 68. The external radius of an upper sidewall piston section 74 is machined and reduced to define a radial clearance between piston 68 and connector sub 72. An annular sloping surface 76 of piston 68 is acted against by the pressurized hydraulic fluid delivered through control conduit 44. In FIGS. 2A–2B, piston 68 is fully extended with the piston shoulder 78 engaging the top annular face 80 of an operator tube 82. In this valve open position, a return spring 84 is fully compressed.

In the illustrated embodiment, a flapper plate 86 is pivotally mounted onto a hinge sub 88 which is threadably connected to the lower end of spring housing 90. A valve seat 92 is confined within a counterbore formed on hinge sub 88. The lower end of safety valve 50 is connected to production tubing 30 by a bottom sub connector 94. The bottom sub connector 94 has a counterbore 96 which defines a valve chamber 98. Thus, the bottom sub connector 94 forms a part of the valve housing enclosure. Flapper plate 86 pivots about pivot pin 100 and is biased to the valve closed position as shown in FIGS. 3A–3B by coil spring 102. In the valve open position as shown in FIGS. 2A–2B, the spring bias force is overcome and flapper plate 86 is retained in the valve open position by operator tube 82 to permit formation fluid flow up through tubing 30.

When an out of range condition occurs and subsurface safety valve 50 must be operated from the valve open position to the valve closed position, hydraulic pressure is released from conduit 44 such that return spring 84 acts on the lower end of piston 68 which retracts operator tube 82 longitudinally through valve chamber 98. Flapper closure plate 86 will then rotate through chamber 98. As flapper closure plate 86 nears the valve closed position within valve chamber 98 where significant throttling of fluid flow occurs, the high magnitude reaction forces may distort the operator tube 82, flapper closure plate 86 or pivot pin 100. Moreover, the alignment of flapper plate 86 relative to valve seat 92 may be disturbed in response to slamming impact of flapper closure plate 86 against valve seat 92.

Figure 4:
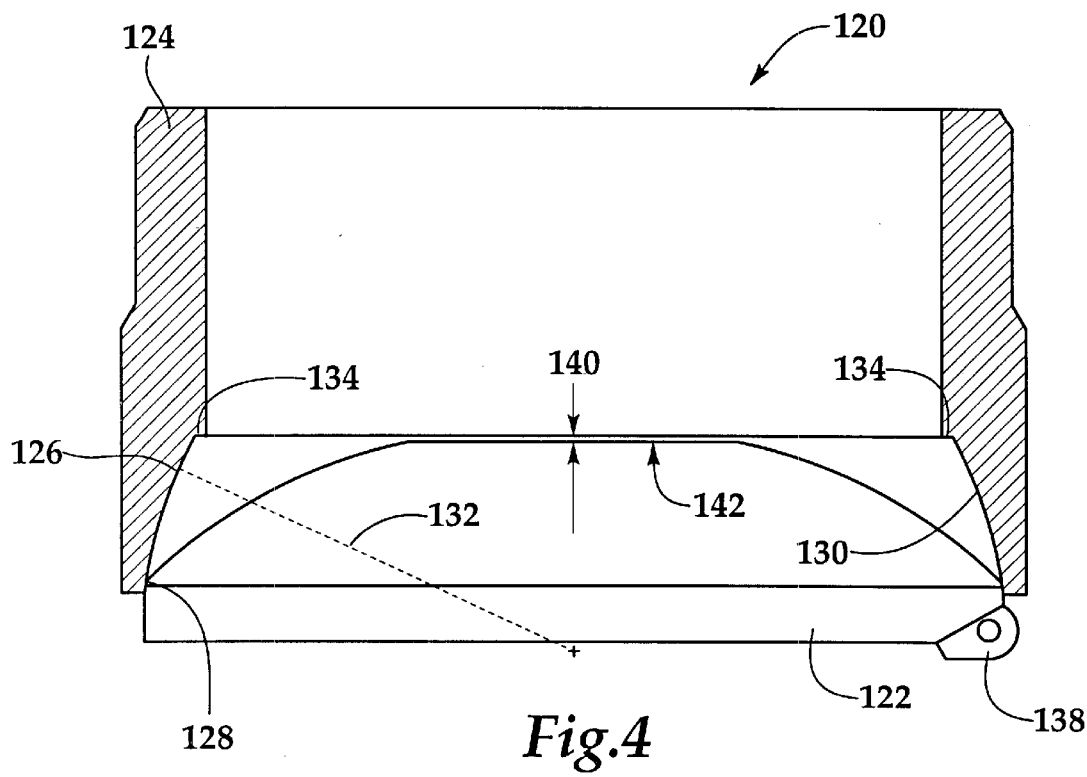
FIG. 4 is a cross sectional view of a valve of the present invention in the valve closed position.

Referring now to FIG. 4, a valve is depicted and generally designated 120. Valve 120 includes a valve closure mechanism which is depicted as flapper closure plate 122. Valve 120 also includes a valve seat 124. In the illustrated embodiment, the sealing surfaces of flapper closure plate 122 and valve seat 124 have mating segments which are matched in curvature to provide a metal-to-metal seal. Sealing surface 126 of valve seat 124 is a concave spherical segment. Sealing surface 128 of flapper closure plate 122 is a convex spherical segment. Convex flapper closure plate sealing surface 128 and concave valve seat sealing surface 126 are both generally a surface of revolution produced by revolving a semi-circular arc having an arc length 130 and radius of curvature 132. As shown in FIG. 4, the radius of curvature of convex flapper closure plate sealing surface 128 is substantially equal to the radius of curvature of concave valve seat sealing surface 126.

Specifically, the spherical radius of curvature of the concave valve seat sealing surface 126 is matched with the spherical radius of curvature of the convex flapper closure plate sealing surface 128. As used herein, "matched radius of curvature" means that the radius of curvature of the flapper plate convex sealing surface 128 is substantially the same as, but not greater than, the radius of curvature of the concave valve seat sealing surface 126. Preferably, the convex and concave surfaces are matched in curvature to provide smooth, non-binding surface engagement of convex flapper closure plate sealing surface 128 against concave valve seat sealing surface 126. The matching convex and concave spherical surfaces 128, 126 are lapped together to permit close nesting engagement of flapper closure plate 122 within valve seat 124. This arrangement permits smooth angular displacement of flapper closure plate 122 relative to valve seat 124 without interrupting surface-to-surface engagement therebetween.

Valve seat 124 includes a secondary load bearing surface which, in the illustrated embodiment, is an internal load bearing shoulder 134 extending generally radially inwardly from concave valve seat sealing surface 126. As explained in more detail below, internal load bearing shoulder 134 defines the maximum travel of flapper closure plate 122 relative to valve seat 124.

Figure 5:
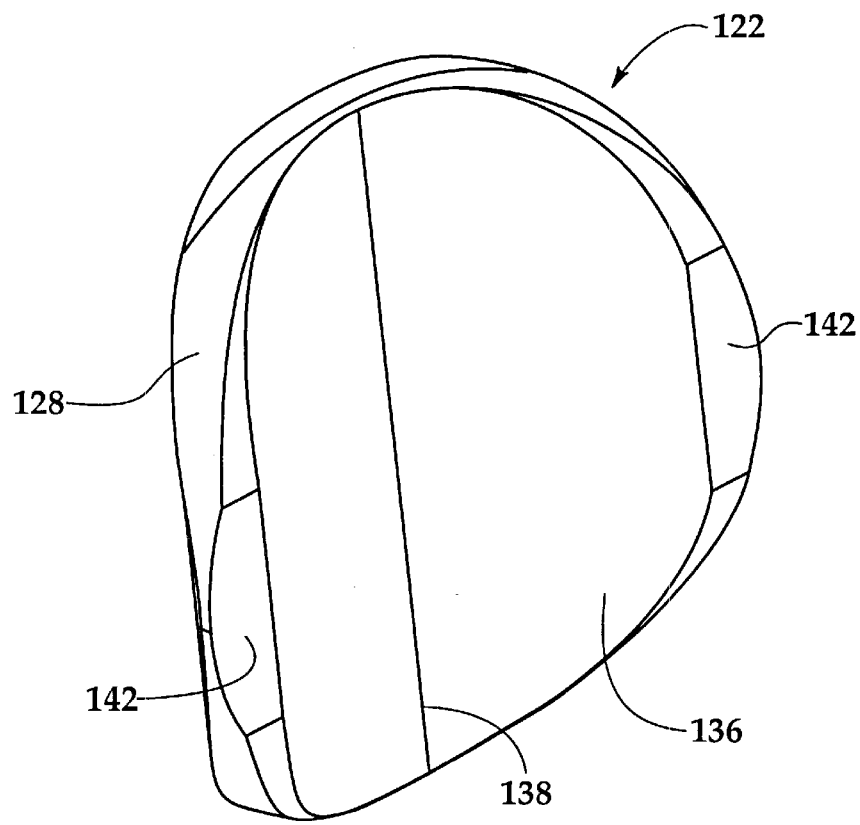
FIG. 5 is a perspective view of a flapper closure plate of a valve of the present invention.

Referring now to FIG. 5, flapper closure plate 122 has a convex spherical sealing surface 128 and a semi-cylindrical channel 136 across the top of flapper closure plate 122 in alignment with its longitudinal axis 138. The radial projection of flapper closure plate 122 is minimized, so that in the valve open position as shown in FIGS. 2A–2B, operator tube 82 is received within semi-cylindrical channel 136, with convex spherical sealing surface 128 projecting into the annulus between operator tube 82 and bottom sub connector 94. Flapper closure plate 122 has a secondary load bearing surface depicted as shoulders 142.

Figure 6:
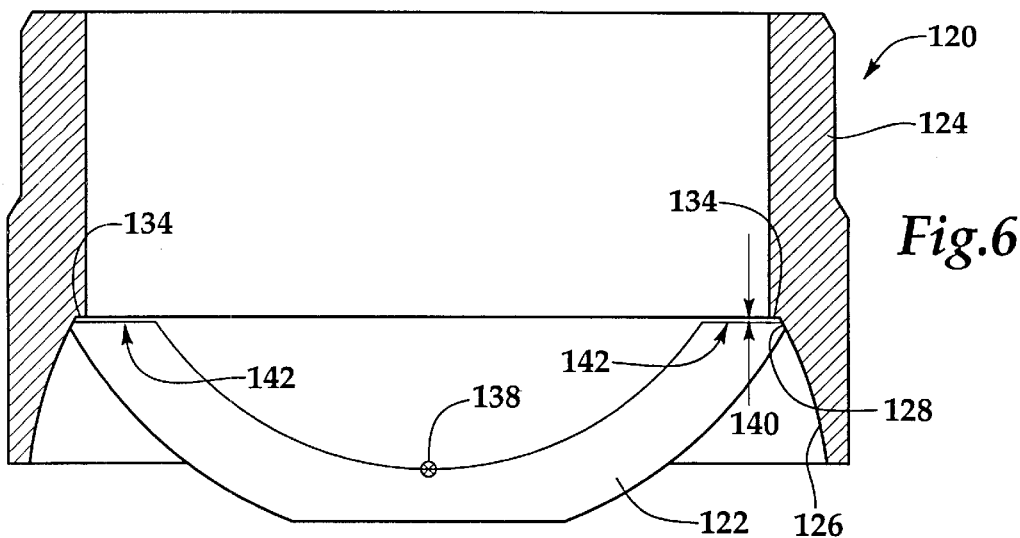
FIG. 6 is a cross sectional view of a valve of the present invention in the valve closed position under typical load conditions.
Figure 7:
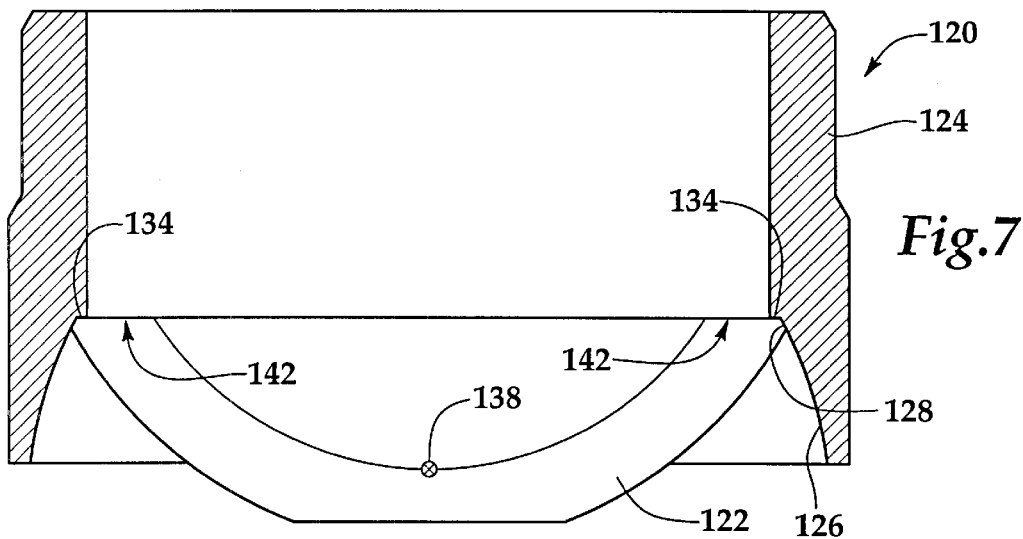
FIG. 7 is a cross sectional view of a valve of the present invention in the valve closed position under high load conditions.

Referring now to FIGS. 6 and 7, valve 120 is depicted in a view that is rotated 90 degrees from that in FIG. 4. Valve 120 includes flapper closure plate 122 and valve seat 124. As explained above with reference to FIG. 4, sealing surface 126 of valve seat 124 is a concave spherical segment and sealing surface 128 of flapper closure plate 122 is a convex spherical segment. Concave sealing surface 126 of valve seat 124 has a radius of curvature that is substantially equal to that of convex flapper closure plate sealing surface 128. Valve seat 124 includes an internal load bearing shoulder 134 extending generally radially inwardly from concave valve seat sealing surface 126 which defines the maximum travel of flapper closure plate 122 relative to valve seat 124.

Under typical flow rate regimes, the matching convex and concave spherical surfaces 128, 126 are lapped together to permit close nesting engagement of flapper closure plate 122 within valve seat 124 as shown in FIG. 6 wherein a gap 140 exists between shoulders 142 of flapper closure plate 122 and internal load bearing shoulder 134 of valve sea 124. In applications where large diameter tubing and largo diameter flapper closure plates are necessary and where the ratio of the outer and inner diameters of the sealing surfaces are low, the loads on flapper closure plate 122 tend to deform flapper closure plate 122 about axis 138 which may result in a loss of seal. Specifically, as flapper closure plate 122 deforms about axis 138, the seal area between flapper closure plate 122 and valve seat 124 could be reduced. As best seen in FIG. 7, internal load bearing shoulder 134 of valve seat 124 defines the maximum travel of flapper closure plate 122 such that any deformation of flapper closure plate 122 about axis 138 that closes gap 140 between shoulders 142 of flapper closure plate and internal load bearing shoulder 134 of valve seat 124 will not reduce the seal area between flapper closure plate 122 and valve seat 124 and will not interrupt surface-to-surface engagement between the nested spherical segments, but will merely shift the region of overlapping engagement. Consequently, a continuous, positive metal-to-metal seal is maintained completely around the spherical segment interface.

Figure 8:
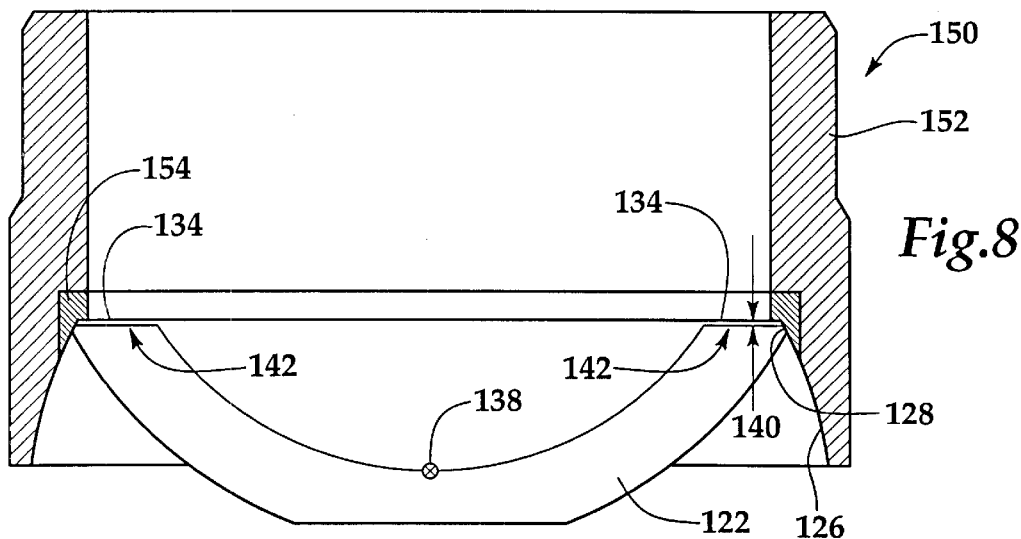
FIG. 8 is a cross sectional view of a valve of the present invention in the valve closed position under typical load conditions.

Referring next to FIG. 8, therein is depicted another embodiment of a valve of the present invention that is generally designated 150. Valve 150 has valve closure member shown as a flapper closure plate 122 and valve seat 152. As with valve 120 of FIGS. 6 and 7, valve seat 152 has concave valve seat sealing surface 126 and flapper closure plate 122 has a convex flapper closure plate sealing surface 128. Concave sealing surface 126 of valve seat 152 has a radius of curvature that is substantially equal to that of convex flapper closure plate sealing surface 128.

Valve seat 152 includes a seal ring insert 154. Seal ring insert 154 forms a portion of concave sealing surface 126 and forms the secondary load bearing surface illustrated as internal load bearing shoulder 134 that extends generally radially inwardly from concave valve seat sealing surface 126. Internal load bearing shoulder 134 defines the maximum travel of flapper closure plate 122 relative to valve seat 152, Preferably, seal ring insert 154 comprises a material that has a higher hardness than valve seat 152. As seal ring insert 154 must withstand extreme loads exerted by shoulders 142 of flapper closure plate 122, the hardness of seal ring insert 154 is an important feature of the present invention. For example, seal ring insert 154 may be formed by machining out a section of valve seat 152 and laying a weld bead therein. The weld bead is then machined smooth to form a portion of concave sealing surface 126 and internal load bearing shoulder 134. Alternatively, seal ring insert 154 may be a solid ring that is welded in place within valve seat 152 then machined smooth to form a portion of concave sealing surface 126 and internal load bearing shoulder 134.

Figure 9:
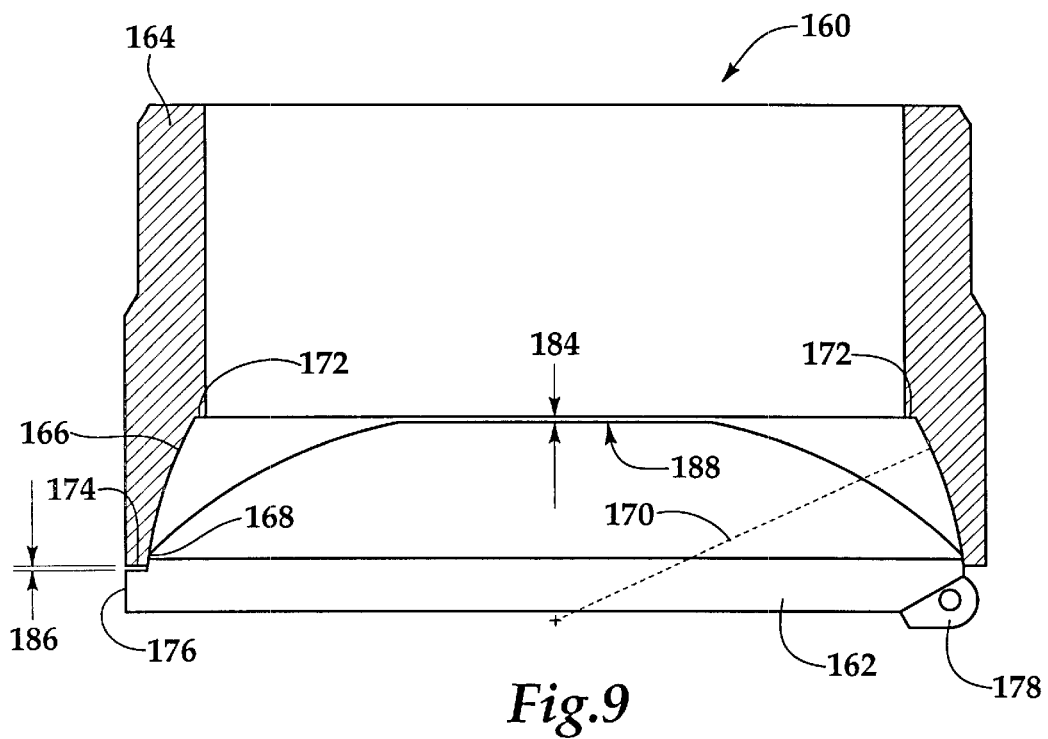
FIG. 9 is a cross sectional view of a valve of the present invention in the valve closed position.

Referring now to FIG. 9, a valve is depicted and generally designated 160. Valve 160 includes a valve closure member shown as a flapper closure plate 162 and a valve seat 164. In the illustrated embodiment, the sealing surfaces of flapper closure plate 162 and valve seat 164 have mating segments which are matched in curvature to provide a metal-to-metal seal. Sealing surface 166 of valve seat 164 is a concave spherical segment. Sealing surface 168 of flapper closure plate 162 is a convex spherical segment. The radius of curvature 170 of convex flapper closure plate sealing surface 168 is substantially equal to the radius of curvature of concave valve seat sealing surface 166.

Specifically, the radius of curvature of the flapper plate convex sealing surface 168 is substantially the same as, but not greater than, the radius of curvature of the concave valve seat sealing surface 166. Preferably, the convex and concave surfaces are matched in curvature to provide smooth, non-binding surface engagement of convex flapper closure plate sealing surface 168 against concave valve seat sealing surface 166. The matching convex and concave spherical surfaces 168, 166 are lapped together to permit close nesting engagement of flapper closure plate 162 within valve seat 164. This arrangement permits smooth angular displacement of flapper closure plate 162 relative to valve seat 164 without interrupting surface-to-surface engagement therebetween.

Valve seat 164 includes two secondary load bearing surfaces, specifically an internal load bearing shoulder 172 extending generally radially inwardly from concave valve seat sealing surface 166 and an external load bearing shoulder 174 extending generally radially outwardly from concave valve seat sealing surface 166. Flapper closure plate 162 also includes two secondary load bearing surfaces depicted as shoulders 188 and ballast member 176. External load bearing shoulder 174 is axially aligned with ballast member 176 of flapper closure plate 162. Ballast member 176 is integral with flapper closure plate 162 and is disposed opposite of pivot pin support member 178. Together, these secondary load bearing surfaces, internal load bearing shoulder 172 and external load bearing shoulder 174, define the maximum travel of flapper closure plate 162 relative to valve seat 164. It should be noted by those skilled in the art that even though ballast member 176 is depicted as integral with flapper closure plate 162, a ballast member could be attached to flapper closure plate 162 using a variety of methods including, but not limited to, welding or bolting.

Figure 10:
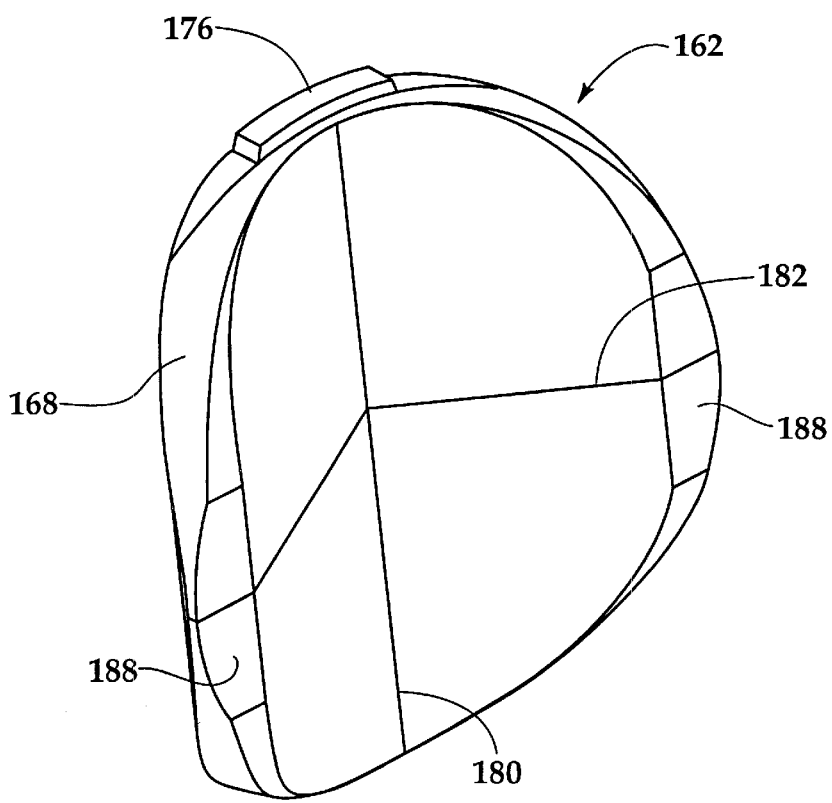
FIG. 10 is a perspective view of a flapper closure plate of a valve of the present invention.

In application where large diameter tubing and large diameter flapper closure plates are necessary and wherein the ratio between the outer and inner diameters of the sealing surfaces is low, the loads on flapper closure plate 162 tend to deform flapper closure plate 162 about both axis 180 and axis 182, as best seen in FIG. 10. As flapper closure plate 62 deforms about axis 180 and gap 184 is closed, internal load bearing shoulder 172 of valve scat 164 defines the maximum travel of shoulders 188 of flapper closure plate 162. Likewise, as flapper closure plate 162 deforms about axis 182 and gap 186 is closed, external load bearing shoulder 174 of valve seat 162 defines the maximum travel of ballast member 176 of flapper closure plate 162. As such, any deformation of flapper closure plate 162 about axis 180 or axis 182 will not reduce the seal area between flapper closure plate 162 and valve seat 164 and will not interrupt surface-to-surface engagement between the nested spherical segments, but will merely shift the region of overlapping engagement. Consequently, a continuous, positive metal-to-metal seal is maintained completely around the spherical segment interface.

Even though FIG. 9 depicts two secondary loads bearings surfaces, internal load bearing shoulder 172 and external load bearing shoulder 174, it should be understood that by those skilled in the art that a single secondary load bearing surface may alternatively be utilized such as internal load bearing shoulder 172, as explained above with reference to FIGS. 4–8, or external load bearing shoulder 174.

Figure 11:
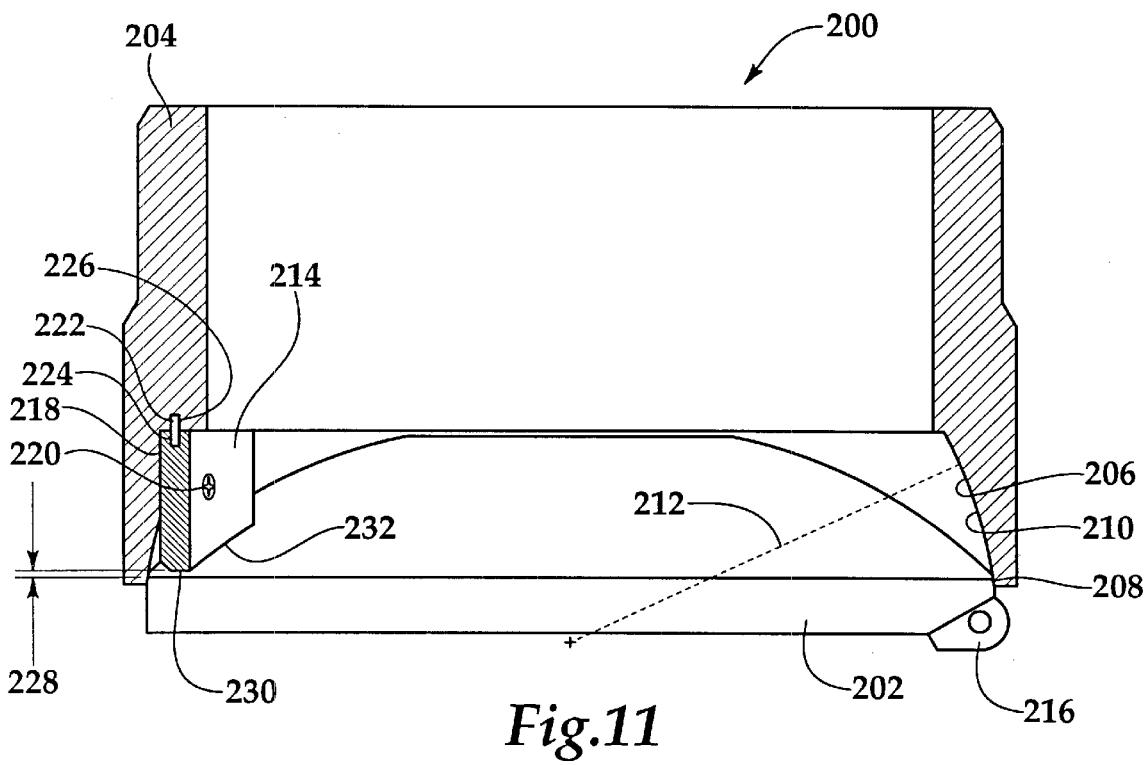
FIG. 11 is a cross sectional view of a valve of the present invention in the valve closed position.

Referring now to FIG. 11, a valve is depicted and generally designated 200. Valve 200 includes a valve closure mechanism depicted as a flapper closure plate 202 and a valve seat 204. In the illustrated embodiment, the sealing surfaces of flapper closure plate 202 and valve seat 204 have mating segments which are matched in curvature to provide a metal-to-metal seal. Sealing surface 206 of valve seat 204 is a concave spherical segment. Sealing surface 208 of flapper closure plate 202 is a convex spherical segment. Convex flapper closure plate sealing surface 208 and concave valve seat sealing surface 206 are both generally a surface of revolution produced by revolving a semi-circular arc having an arc length 210 and radius of curvature 212. As shown in FIG. 11, the radius of curvature of convex flapper closure plate sealing surface 208 is substantially equal to the radius of curvature of concave valve seat sealing surface 206.

Preferably, the convex and concave surfaces are matched in curvature to provide smooth, non-binding surface engagement of convex flapper closure plate sealing surface 208 against concave valve seat sealing surface 206. The matching convex and concave spherical surfaces 208, 206 are lapped together to permit close nesting engagement of flapper closure plate 202 within valve seat 204. This arrangement permits smooth angular displacement of flapper closure plate 202 relative to valve seat 204 without interrupting surface-to-surface engagement therebetween.

Valve seat 204 includes a secondary load bearing surface depicted as internal support member 214 extending generally radially inwardly about a portion of the circumference of concave valve seat sealing surface 206 on the side opposite hinge 216. Internal support member 214 is positioned within a pocket 218 cut in concave valve sealing surface 206 of valve seat 204. Internal support member 214 is securably attached within pocket 218 using suitable means of such a one or more bolts 220. Internal support member 214 is properly aligned within pocket 218 using pin 222 that extends into hole 224 of internal support member 214 and hole 226 of valve seat 204. Internal support member 214 defines the maximum travel of flapper closure plate 202 relative to valve seat 204.

Figure 12:
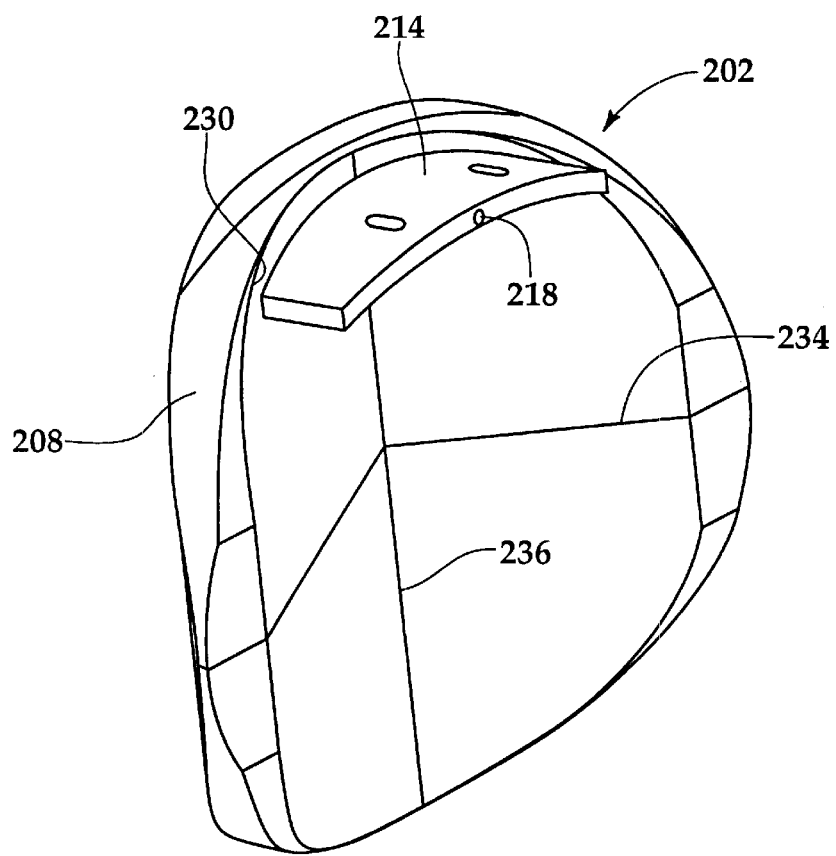
FIG. 12 is a perspective view of a flapper closure plate positioned against a support member of a valve of the present invention.

Under typical flow rate regimes, the matching convex and concave spherical surfaces 208, 206 are lapped together to permit close nesting engagement of flapper closure plate 202 within valve seat 204 as shown in FIG. 11 wherein a gap 228 exists between a secondary load bearing surface 230 of flapper closure plate 202 and surface 232 of internal support member 214. In applications where large diameter tubing and large diameter flapper closure plates are necessary and where the ratio of the outer and inner diameters of the sealing surfaces are low, the loads on flapper closure plate 202 tend to deform flapper closure plate 202 about both axis 234 and axis 236, as best seen in FIG. 12, which may result in a loss of seal. Specifically, as flapper closure plate 202 deforms about axes 234, 236, the seal area between flapper closure plate 202 and valve seat 204 could be reduced. Internal support member 214 defines the maximum travel of flapper closure plate 202 such that any deformation of flapper closure plate 202 closes gap 228 but will not reduce the seal area between flapper closure plate 202 and valve seat 204 and will not interrupt surface-to-surface engagement between the nested spherical segments, merely shifting the region of overlapping engagement. Consequently, a continuous, positive metal-to-metal seal is maintained completely around the spherical segment interface.

While FIG. 11 has been described with reference to a single secondary load bearing surface, i.e. support member 214, it should be understood by those skilled in the art that support member 214 may be used in conjunction with an internal load bearing shoulder 134 as described above with reference to FIGS. 4–7 or an external load bearing shoulder 174 as described above with reference to FIGS. 9–10 or both.

Alternatively, it should be noted that internal support member 214 may be secured to flapper closure plate 202 such that when flapper closure plate 214 is in the closed position, internal support member 214 is received within pocket 218 which serves as the secondary load bearing surface of valve seat 204. In another alternative, internal support member 214 may be received within or against a secondary load bearing surface of the valve housing as opposed to the valve seat 214.

Figure 13:
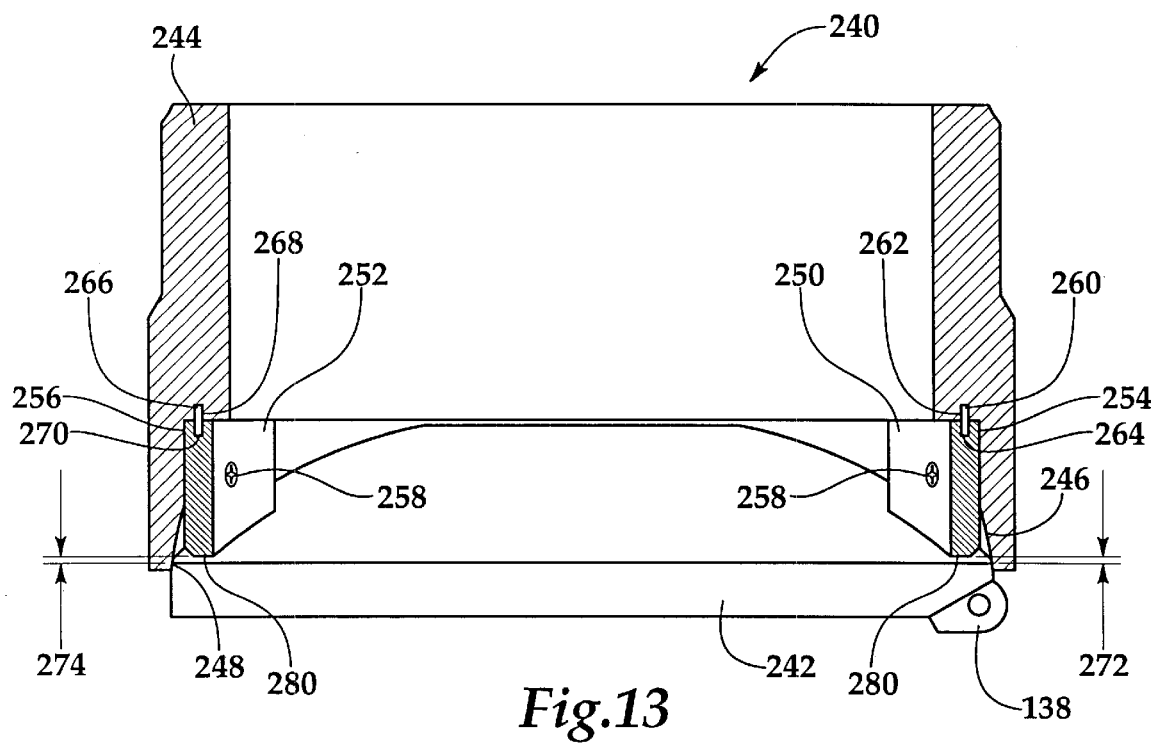
FIG. 13 is a cross sectional view of a valve of the present invention in the valve closed position.

Referring now to FIG. 13, a valve is depicted and generally designated 240. Valve 240 includes a valve closure member depicted as a flapper closure plate 242 and a valve seat 244. In the illustrated embodiment, the sealing surfaces of flapper closure plate 242 and valve seat 244 have mating segments which are matched in curvature to provide a metal-to-metal seal. Sealing surface 246 of valve seat 244 is a concave spherical segment. Sealing surface 248 of flapper closure plate 242 is a convex spherical segment. Preferably, the convex and concave surfaces are matched in curvature to provide smooth, non-binding surface engagement of convex flapper closure plate sealing surface 248 against concave valve seat sealing surface 246. The matching convex and concave spherical surfaces 248, 246 are lapped together to permit close nesting engagement of flapper closure plate 242 within valve seat 244. This arrangement permits smooth angular displacement of flapper closure plate 242 relative to valve seat 244 without interrupting surface-to-surface engagement therebetween.

Valve seat 244 includes a secondary load bearing surface depicted as a pair of internal support members 250, 252 extending generally radially inwardly about portions of the circumference of concave valve seat sealing surface 246. Internal support members 250, 252 are positioned within pockets 254, 256 cut in concave valve sealing surface 246 of valve seat 244. Internal support members 250, 252 are secured within pockets 254, 256 using by suitable means such as one or more bolts 258. Internal support member 250 is aligned within pocket 254 using a pin 260 that extends between hole 262 of valve seat 244 and hole 264 at internal support member 250. Internal support member 252 is aligned within pocket 256 using a pin 266 that extends between hole 268 of valve seat 244 and hole 270 of internal support member 252.

Figure 14:
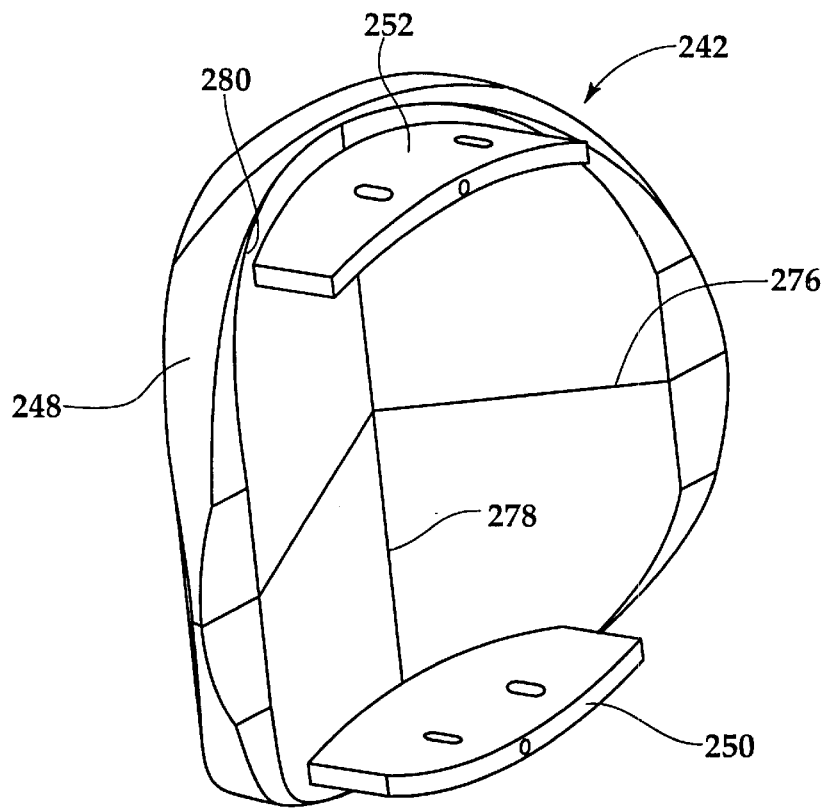
FIG. 14 is a perspective view of a flapper closure plate positioned against a pair of support members of a valve of the present invention.

Internal support members 250, 252 define the maximum travel of flapper closure plate 242 relative to valve seat 244. Under typical flow rate regimes, the matching convex and concave spherical surfaces 248, 246 are lapped together to permit close nesting engagement of flapper closure plate 242 within valve seat 244, as shown in FIG. 13, wherein gaps 272, 274 exists between secondary load bearing surface 280 of flapper closure plate 242 and internal support members 250, 252. In applications where large diameter tubing and large diameter flapper closure plates are necessary and where the ratio of the outer and inner diameters of the sealing surfaces are low, the loads on flapper closure plate 242 tend to deform flapper closure plate 242 about both axis 276 and axis 278, as best seen in FIG. 14, which may result in a loss of seal. Specifically, as flapper closure plate 242 deforms about axes 276, 278, the seal area between flapper closure plate 242 and valve seat 244 could be reduced. Internal support members 250, 252 defines the maximum travel of flapper closure plate 242 such that any deformation of flapper closure plate 242 closes gaps 272, 274 but will not reduce the seal area between flapper closure plate 242 and valve seat 244 and will not interrupt surface-to-surface engagement between the nested spherical segments, merely shifting the region of overlapping engagement. Consequently, a continuous, positive metal-to-metal seal is maintained completely around the spherical segment interface.

Even though FIG. 13 has depicted the secondary load bearing surface as consisting of a pair of internal support members 250, 252, it should be understood by those skilled in the art that these secondary load bearing surfaces may be used in conjunction with the other secondary load bearing surfaces described above including internal load bearing shoulder 134 of FIG. 4 and external load bearing shoulder 174 of FIG. 9.

Alternatively, it should be noted that internal support members 250, 252 may be secured to flapper closure plate 242 such that when flapper closure plate 242 is in the closed position, internal support members 250, 252 are received within pockets 254, 256 which serve as the secondary load bearing surface of valve seat 244. In another alternative, internal support members 250, 252 may be received within or against a secondary load bearing surface of the valve housing as opposed to the valve seat 244.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A subsurface safety valve adapted to be placed in a well tubing string to control flow therethrough comprising;
   a valve housing having a bore therethrough;
   a flapper closure plate mounted within the bore of the housing and movable between a valve open position and a valve closed position, the flapper closure plate having a sealing surface and a secondary load bearing surface;
   an operator movably disposed within the bore of the housing for controlling movement of the flapper closure plate between the valve open position and the valve closed position;
   a valve seat disposed within the valve housing, the valve seat having a flow passage bore and a sealing surface, in the valve closed position, the sealing surface of the flapper closure plate sealingly engaging the sealing surface of the valve seat;
   a valve secondary load bearing surface receiving the secondary load bearing surface of the flapper closure plate to define the maximum travel of the flapper closure plate.

2. The subsurface safety valve as recited in claim 1 wherein the valve secondary load bearing surface is supported by the valve seat.

3. The subsurface safety valve as recite in claim 1 wherein the valve secondary load bearing surface is supported by the valve housing.

4. The subsurface safety valve as recited in claim 1 wherein the valve secondary load bearing surface further comprises an internal load bearing shoulder.

5. The subsurface safety valve as recited in claim 1 wherein the valve secondary load bearing surface further comprises an external load bearing surface.

6. The subsurface safety valve as recited in claim 5 wherein the flapper closure plate further comprises a ballast member and wherein the external load bearing surface of the valve seat and the ballast member of the flapper closure plate defining the maximum travel of the flapper closure plate in the closed position.

7. The subsurface safety valve as recited in claim 1 wherein the valve secondary load bearing surface further comprises an internal support member.

8. The subsurface safety valve as recited in claim 1 wherein the valve secondary load bearing surface further comprises first and second internal support members.

9. The subsurface safety valve as recited in claim 1 wherein the valve secondary load bearing surface further comprises an internal support member and an internal load bearing shoulder.

10. The subsurface safety valve as recited in claim 1 wherein the valve secondary load bearing surface further comprises first and second internal support members and an internal load bearing shoulder.

11. The subsurface safety valve as recited in claim 1 wherein the valve secondary load bearing surface further comprises an internal support member and an external load bearing surface.

12. The subsurface safety valve as recited in claim 1 wherein the valve secondary load bearing surface further comprises first and second internal support members and an external load bearing surface.

13. The subsurface safety valve as recited in claim 1 further comprising a seal ring insert within the valve seat.

14. The subsurface safety valve as recited in claim 12 wherein the seal ring insert further comprises a solid ring.

15. The subsurface safety valve as recited in claim 12 wherein the seal ring insert further comprises a machined weld bead.

16. The subsurface safety valve as recited in claim 1 wherein the sealing surface of the flapper closure plate forms a convex spherical segment having radius of curvature and wherein the valve seat sealing surface forms a concave spherical segment having a radius of curvature that is substantially matched with the radius of curvature of the convex spherical segment of the flapper closure plate to permit nesting engagement of the convex spherical segment of the flapper closure plate against the concave spherical segment of the valve seat.

* * * * *